Dec. 9, 1969     T. P. MURRAY     3,483,378
APPARATUS FOR DETERMINING THE EMITTANCE OF A BODY
Original Filed Feb. 25, 1966     3 Sheets-Sheet 1
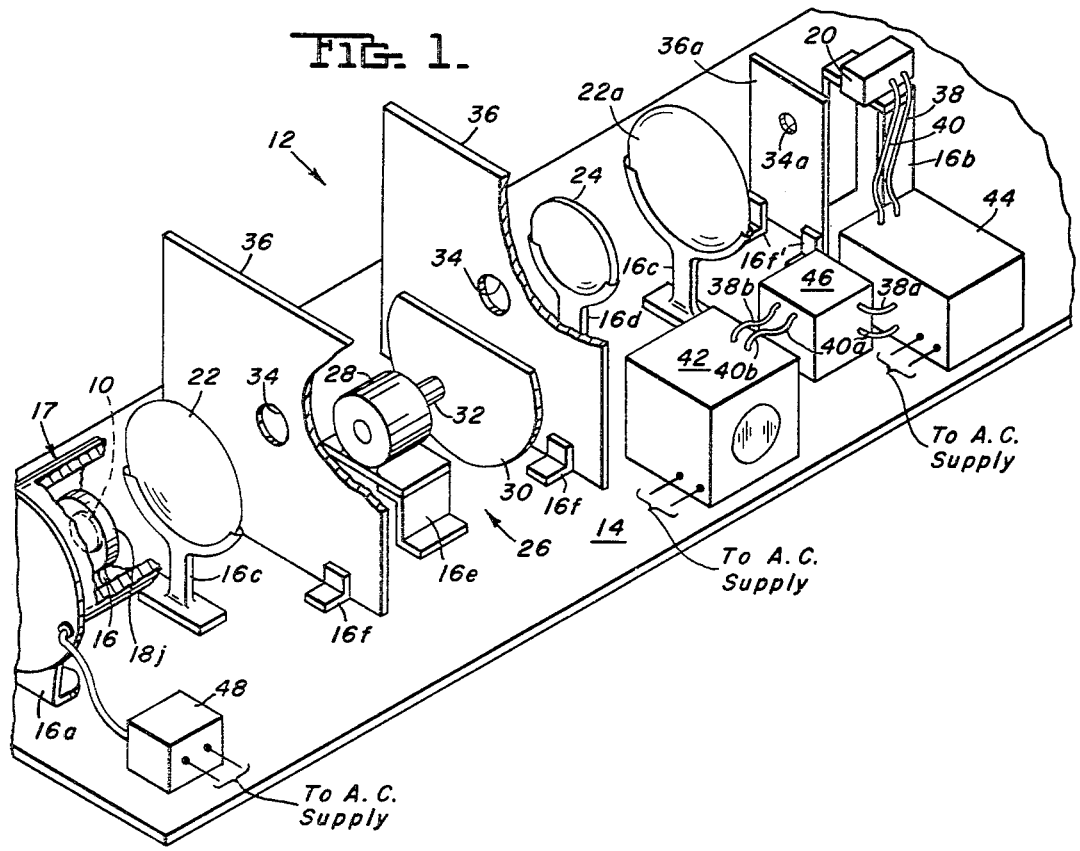
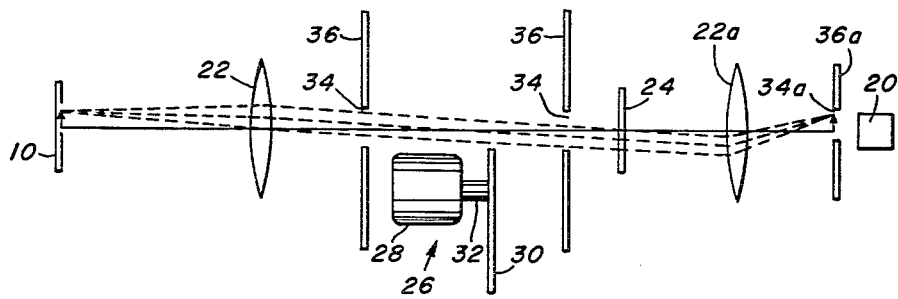
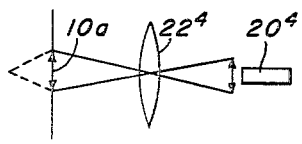 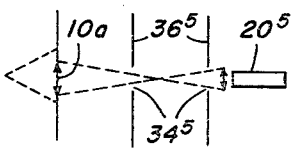
INVENTOR.
THOMAS P. MURRAY
By Donald G. Dalton
Attorney

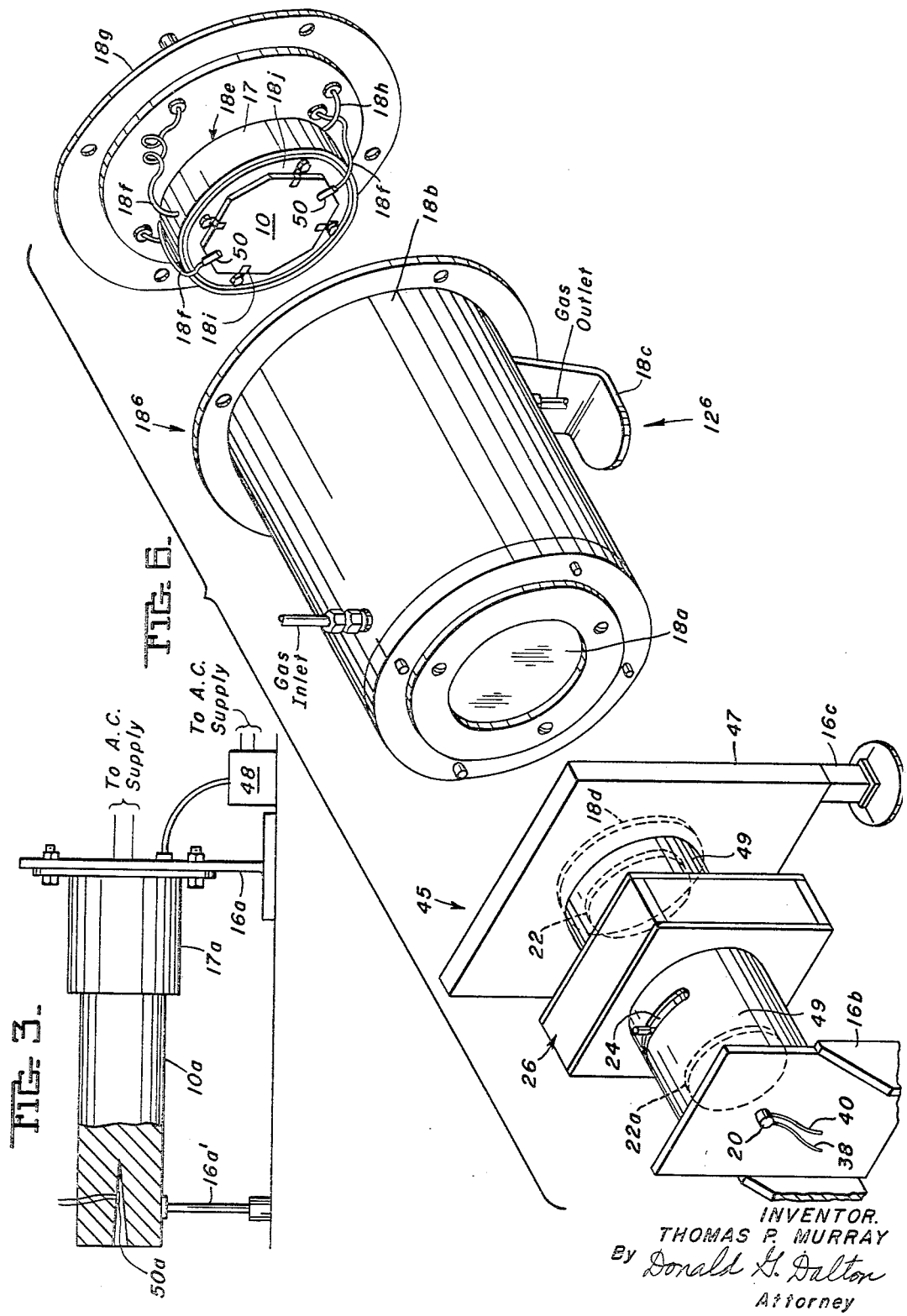

Backbody Source (BP217-7 Filter)

Emittance of Unmelted Tinplate

Emittance of Blackplate

Emittance of Aluminum-coated Blackplate

Emittance of Melted Tinplate

LEGEND —
Filter BP217-7
⊙ — No. 7 Finish
△ — No. 5 Finish
▫ — No. 3 Finish
◊ — Full-hard INVENTOR.
THOMAS P. MURRAY
By Donald H. Dalton
Attorney United States Patent Office 3,483,378
Patented Dec. 9, 1969

3,483,378
APPARATUS FOR DETERMINING THE
EMITTANCE OF A BODY
Thomas P. Murray, Pittsburgh, Pa., assignor to United
States Steel Corporation, a corporation of Delaware
Continuation of application Ser. No. 530,014, Feb. 25,
1966. This application June 19, 1968, Ser. No. 739,916
Int. Cl. G01t 1/16
U.S. Cl. 250—83.3         8 Claims

ABSTRACT OF THE DISCLOSURE

This invention contemplates apparatus for the measurement of the emittance of a heated body, the apparatus having a frame, the body being mounted on the frame, heating means associated with the heated body to heat and to maintain it at a predetermined temperature, temperature measuring means associated with the heated body for indicating its temperature, thermal radiation detection means on the frame adjacent the body for measuring the thermal radiation from the body, and chopping means on the frame adjacent the thermal radiation detection means for converting the thermal radiation to an alternating radiation signal.

BACKGROUND OF THE INVENTION

This invention relates to radiation pyrometry and more particularly to an improved apparatus for determining the emittance of a body.

This application is a continuation of application Ser. No. 530,014 now abandoned.

In measuring the temperature of a body by means of the thermal radiation which the body emits, it must be understood that different objects at the same temperature differ in their ability to emit radiation. This difference in the ability of a body to emit thermal radiation is essentially a surface phenomenon. If a sufficiently small probe were inserted into the interior of heated opaque bodies of different composition and structure, and such bodies were all at the same uniform temperature, there would be no difference in the radiation observed in different spectral regions or over the whole spectrum.

The fact that light is reflected differently by different surfaces is a matter of common observation. Heat radiation behaves similarly. The common situation observed is where light or heat radiation strikes the surface of the body from the exterior and is partially reflected from the exterior.

The same phenomenon occurs for light or heat falling upon the boundary between a solid body and a fluid, such as air, from the interior of the solid body. For this reason, when radiation is incident on a solid surface from the interior of the solid body, the fraction of the radiation reflected and the fraction of the radiation passing through the surface are determined by the type of material in the solid body, and the particular character of the surface of the solid body. For example, a piece of polished aluminum is an excellent reflector, and a piece of rough carbon is a poor reflector. When polished aluminum and rough carbon are heated to the same temperature the aluminum emits relatively little thermal radiation, because most of the thermal radiation is reflected back into the aluminum at the surface thereof. The carbon emits considerably more radiation, because less radiation is reflected back into the interior at the surface of the carbon. This relative ability of a body to emit thermal radiation is characterized by a factor called the "emittance."

In order to make quantative measurements, a standard is required. Such a standard is obtained by forming a cavity in a solid body, and making a small sight hole connecting this cavity to the exterior thereof. Since there is no solid-air boundary in the sight hole, there is no reflection loss, and the cavity, as viewed through the sight hole, can be defined to have an emittance of 1.00. From what has been said previously, the radiation from this cavity will depend only upon temperature, and not on the properties of the material in which the cavity is formed. Such radiation is termed "blackbody" radiation. Any solid material on which it is desired to make temperature measurements (without a cavity), will have some surface reflectance, and consequently will have an emittance less than one. Hence. the emittance, or emittance factors, of actual material of interest will vary between 0 and 1.00. From what has been said, it is obvious that the emittance factors for various materials can be obtained by measuring the radiation from a blackbody (cavity) source, and from a sample of the material, at the same temperature, and taking the ratio of these measurements.

It is possible to design the cavity and the sight hole so that an opening of appreciable size, such as an opening of ½-inch or 2 inches in diameter, can be employed. Such cavities have, as a sufficiently good engineering approximation, an emittance of 1.00.

In order to use the emitted radiation from a body to measure the temperature of the body, the emittance factor of the body in the temperature range being measured must be known and determined. The emittance of the target varies with composition, temperature, surface roughness, surface coatings and microstructure of the target.

OBJECTS OF THE INVENTION

It is the general object of the present invention to avoid and overcome the foregoing and other difficulties of and objections to prior art practices for the measurement of temperature by the provision of an improved apparatus for determining the emittance of a body, which apparatus and method:

(1) Measures the emittance of any body routinely;

(2) Determines the best value of the emittance for a body in a given temperature range for use with a given pyrometer in measuring the temperature;

(3) Determines the range of values of emittance for a given process material in a given temperature measurement problem, thus defining the possible errors in the measured temperature due to such variations, and thus providing a quantitative basis for the selection of a given spectral region for the measurements;

(4) Provides a wide capability and flexibility in determining the wave length and type detector which should be employed for a particular application; and (5) Provides the best average value of emittance for a given pyrometer use.

BRIEF SUMMARY OF THE INVENTION

The aforesaid objects of the present invention, and other objects which will become apparent as the description proceeds, are achieved by providing apparatus for the measurement of the emittance of a heated body. This apparatus has a frame with the body being mounted on the frame. Heating means are associated with the heated body to heat and to maintain it at a predetermined temperature. Temperature measuring means are also associated with it for indicating its temperature. A thermal radiation detection means is on the frame adjacent the body for measuring the thermal radiation from the body. A chopping means is on the frame adjacent the thermal radiation detection means to convert the thermal radiation to a radiation signal detection means.

BRIEF DESCRIPTION OF THE SEVERAL VIEWS OF THE DRAWINGS

For a better understanding of the present invention reference should be had to the accompanying drawings, where like numerals of reference indicate similar parts throughout the several views and wherein:

FIGURE 1 is an isometric view of the apparatus for measuring the emittance of a heated body with the sample temperature measuring device removed for clarity;

FIGURE 2 is a diagrammatic side elevational view of the optical system of the apparatus of FIGURE 1;

FIGURE 3 is a side elevational view partially in section of a blackbody and showing the emitting portion of the blackbody disposed in a direction opposite to the emitting portion of the sample shown in FIGURE 1;

FIGURES 4 and 5 are diagrammatic views of alternative optical systems for detecting thermal radiation per unit area, per unit time and per unit solid angle;

FIGURE 6 is an isometric view of an alternative embodiment having a furnace for heating sample bodies in a protective atmosphere and the sample temperature measuring device and showing the sample disposed in a direction opposite to the sample shown in FIGURE 1 and the detector assembly of FIGURE 1;

DETAILED DESCRIPTION

Figure 7:
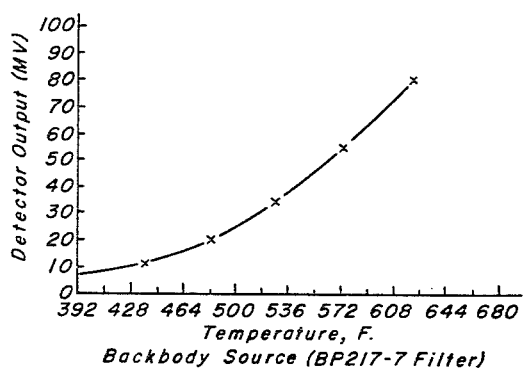
FIGURE 7 is a graph of output of the detector in millivolts versus temperature in ° F. for a blackbody utilizing a particular filter.
Figure 10:
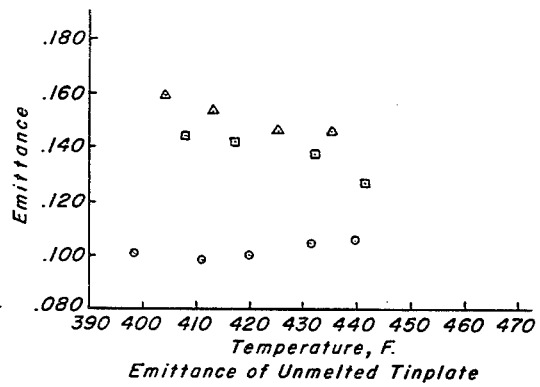
FIGURES 8–11 are graphs of emittance factors versus temperature in ° F. for samples of various materials having various finishes which emittance factors were obtained by utilizing the same filter.
Figure 8:
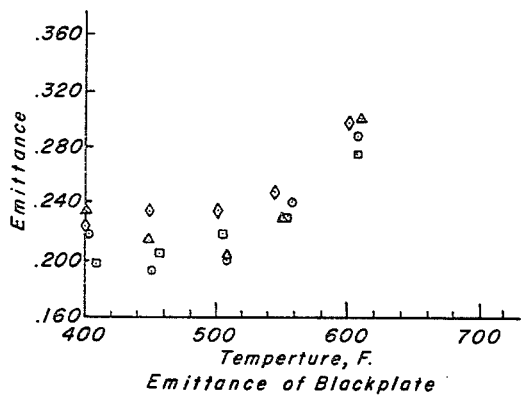
Figure 11:
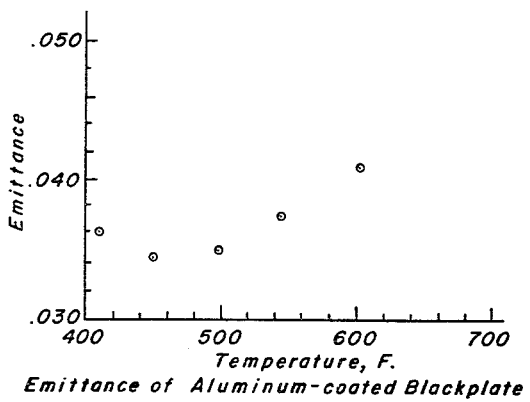
Figure 9:
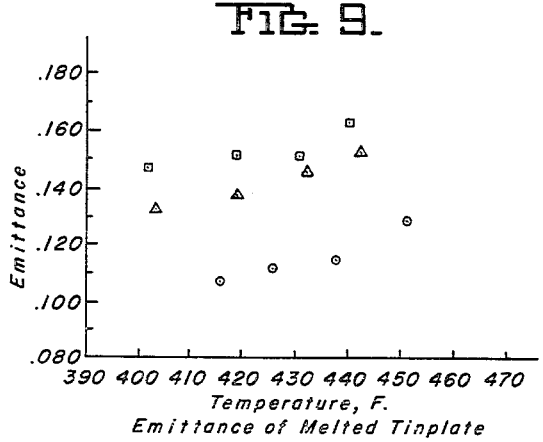

Although the principles of the present invention are broadly applicable to radiation pyrometry, the present invention is particularly adapted for use in conjunction with apparatus and method for determining the emittance of a body and hence it has been so illustrated and will be so described.

With specific reference to the form of the present invention illustrated in the drawings, and referring particularly to FIGURE 1, an apparatus or optical bench of the present invention for measuring the emittance of a heated body or a sample 10, is indicated generally by the reference numeral 12.

This apparatus 12 has a frame, suitably a table or mounting bar 14 (FIGURE 1). The heated body 10 is mounted within a housing 17 of a heating means 18 in a manner similar to that shown in FIGURE 6. This heating means 18, such as an electric heater or the copper disc type 18j, has heating elements (not shown) of the cartridge type or elements fabricated from commercial heater wires. Referring to FIGURE 6, the heated body 10 is secured by spring clips 18i to the copper disc 18j of the housing 17. The housing 17 is mounted on the table 14 by means of a bracket 16a (FIGURE 1).

A thermal radiation detection means or device 20 (FIGURES 1, 2), such as a lead sulfide of lead selenide photoconductive sensor for the infrared of the type manufactured by Eastman Kodak Company, Rochester, N.Y. as the Ektron Detector, is mounted by bracket 16b on the frame 14 adjacent the body 10 for measuring the thermal radiation (indicated by the dotted lines in FIGURE 2) from the body 10. The thermal radiation detection device 20 consists of a photoconductive substance deposited with conducting electrodes on a glass or other dielectric base. Changes in thermal radiation produce changes in resistance in the thermal radiation detection device 20 and such resistance changes may be observed as an electrical signal. The thermal radiation detection device 20 functions as a pure Ohm's Law resistor with no diode effect. The device 20 is not subject to microphonics and the sensitive area may be almost any size or shape with maximum sensitivity in the infrared region of the spectrum.

For the purpose of focusing the thermal radiations (indicated by the dotted lines in FIGURE 2) from the body 10 on the thermal radiation detection device 20, a focusing means, such as the lens 22 (FIGURES 1, 2), is mounted on bracket 16c on the table 14 adjacent the body 10. The lens 22 may be, for example, of the double convex type.

The device utilized for selecting a predetermined wave length or band of the thermal radiations (indicated by the dotted lines in FIGURE 2) directed to the thermal radiation detection device 20, is a filter means, such as the filter 24, which filter 24 is mounted at 16d on the frame 14 adjacent the thermal radiation detection device 20. This filter 24 may be of the interference type.

ALTERNATIVE EMBODIMENTS

It will be understood by those skilled in the art that alternatively as shown in FIGURES 1, 2, chopping means, such as the chopper 26 (having a motor 28 and a hemidisc 30 mounted on the shaft 32 of the motor 28) is disposed on the frame 14 at 16e for converting the thermal radiations (indicated by the dotted lines in FIGURE 2) from the body 10 and traveling to the thermal radiation detection device 20. Such chopper 26 converts the thermal radiations falling upon the detector 20 into an alternating signal of known frequency thus permitting such signal to be amplified and selectively separated from the noise generated by the detector 20 and other components of the system 12 so that smaller signals at lower source temperatures can be measured.

Further, the lens 22 may direct the thermal radiations to a limiting means, such as the apertures 34 (FIGURES 1, 2) in plates 36, which plates 36 are mounted at 16f adjacent the chopper 26 for limiting the cross-sectional area of the beam of thermal radiations from the body 10 directed to the thermal radiation detection device 20. As shown in FIGURES 1, 2, a second lens 22a to increase thermal radiation received by the detector 20 may be employed beyond the chopper 26 and adjacent the filter 24.

In addition, the electrical signal from the thermal radiation detection device 20 is carried by conductors 38, 40, 38a, 40a, 38b, 40b (FIGURE 1) to a storage means, such as a storage oscilloscope 42 of the type similar to Type 564 manufactured by the Tekronics, Inc., Portland, Ore. The storage oscilloscope 42 mounted on the frame 14 receives the electrical signal from the device 20 and measures the magnitude of the electrical signal.

In order to amplify the electrical signal from the device 20, preamplifier means, such as the detector preamplifier 44 (FIGURE 1 and of the type similar to Type DP-2C, manufactured by Barnes Engineering Company, Stamford, Conn.) may be used. The detector preamplifier 44 has a wide frequency response thus making it suitable for use with the lead sulfide detector 20. For the purpose of attenuating electrical frequencies other than the frequency of rotation of the chopper 26 (i.e., for example, five cycles/second), a band pass filter 46 (FIGURE 1), such as a White Instrument Laboratory, Austin, Tex., Model No. 557—25% (5.0 c.p.s.) is disposed between the preamplifier 44 and the oscilloscope 42.

The basic operation of the apparatus has now been described. In some applications for which values of emittance are required, the samples 10 or process material are heated in air, in which case the apparatus (FIGURE 1) already described will suffice. In other cases, the samples 10 or process material will be heated without oxidation, as for example in a continuous annealing line where a steel strip 10 is heated to 1400° F. without oxidation. For this reason, additional provision has been made in this apparatus (FIGURE 6) for heating the samples in various environments.

The pressure vessel 18b, shown in FIGURE 6, was constructed for use in heating samples 10 to about 1400° F. in various atmospheres. Samples 10 were heated to 1400°

F. in about 3% hydrogen, balance nitrogen protective atmosphere without oxidation, to determine emittance values for clean steel up to that temperature. It is possible to oxidize and remove oxide as desired, by changing the atmosphere in the pressure vessel 18b to determine the effects of varying oxides on pyrometer readings and to establish the limits of temperature error for a given pyrometer used in a given process.

To maintain gas seals around the electrical leads, such as the heater wires (not shown), thermocouple leads 18f (FIGURE 6) are brought out through the base plate 18g by means of short segments of stainless steel sheathed, magnesium oxide insulated wire 18h similar to the heater elements (not shown) described above. In all themocouple circuits, the wire throughout is chromel and alumel. There are no thermal junctions except at the measuring junction and at the reference junction.

Referring to the alternative embodiment of FIGURE 6, a detector assembly 45 embodying the optical arrangement, is shown at the left of FIGURE 6. When this detector assembly 45 is used, a window 18a of a pressure vessel 18b in the center of FIGURE 6 is removed, and the pressure vessel 18b is mounted against a plate 47 on upright 16c with an O-ring seal 18d against the objective lens 22 of the detector assembly 45, which lens 22 is disposed within the plate 47. Lens 22a and filter 24 are mounted in housing 49. This objective lens 22 then views the sample 10 directly with no intervening additional windows and the sample 10 is heated in a reducing atmosphere, such as hydrogen nitrogen atmosphere or an oxidizing atmosphere, such as air, as desired. For samples 10 heated in air, the pressure vessel 18b can be omitted. The comparison measurements on a blackbody 10a mounted as shown in FIGURE 3 in a holder 17a are made by removing the pressure vessel 18b and sample heating assembly 18e (FIGURE 6) and placing the blackbody source 10a the same distance from the detector assembly 45 as the sample 10.

The detector assembly 45 is, of course, a complete pyrometer in itself. During some of the tests the detector assembly 45 was used as a lead sulfide pyrometer with a filter 24 having a bandpass of 1.8 to 2.7 microns. However, the detector assembly 45 can readily be converted to another type of pyrometer by changing the detector 20 and filter 24, and, if necessary, the lenses 22, 22a. This new detector assembly 45 can then be calibrated on the blackbody 10a shown in FIGURE 3 and its capabilities for a particular measurement application can readily be evaluated.

In some cases, the particular combination of detector cell 20 and filter 24, which it is desired to study for a particular application, is already embodied in an existing commercial pyrometer (not shown). In that case, the commercial pyrometer is used in place of the detector assembly 45.

When emittance determinations are made using a commercial pyrometer (not shown), the pyrometer (not shown) under test replaces the detector assembly 45 at the left of FIGURE 6, and the pyrometer (not shown) views the sample 10 either in air without the pressure vessel 18b or through the quartz window 18a of the pressure vessel 18b. In the latter case, the pyrometer (not shown) is also calibrated on the blackbody 10a, as viewed through the quartz window 18a, to calibrate out the effect of the window 18a.

This apparatus 12 shown in FIGURE 6 provides a great degree of capability and flexibility in determining what wave length ranges and what detectors 20 should be used for various applications.

OPERATION

The method utilized for measuring the emittance factor of the body 10 is the "ratio" or "substitution" method. This method involves substituting the body 10 of unknown emittance factor for a blackbody 10a (FIGURE 3) at the same distance from the detector 20 and under the same conditions of viewing. Since the geometry of the optical bench 12 (FIGURE 1) is fixed, if the target areas of the body 10 and blackbody 10a are sufficient to cover the field of view, the only factor changed is the emittance factor of the body 10. This emittance factor is the ratio of the readings for the body 10 and blackbody 10a at the same temperature.

The blackbody 10a (FIGURE 3) and the heated body 10 (FIGURE 1) each has its own temperature controller 48 so that blackbody 10a and heated body 10 can be taken separately to, and maintained at, a given temperature. These temperature controllers 48 are of the type manufactured by the Barnes Engineering Company, as Model 11–200T Solid State Temperature Controller. The stability of the controllers 48 is excellent and temperature variations are within about 5° F. over periods of hours.

Sample temperatures are read by two thermocouples 50 (FIGURE 6) attached to the heated body 10 at different radii, so that the presence of thermal gradients in the heated body 10 can be detected. In tests differences are usually of the order of ±5° F.

In using a blackbody 10a (FIGURE 3) of the type similar to Type 11–201, manufactured by Barnes Engineering Company, Stamford, Conn. and provided with 0.5 inch diameter aperture for calibration, the desired temperature of the blackbody 10a is set on the controller 48 provided with the apparatus 12. The controller 48 will then heat the blackbody 10a to, and maintain it at, the desired temperature. Tests show that the indicated temperature agrees with the temperature measured by a thermocouple 50a (FIGURE 3) embedded in the blackbody 10a within about 1%.

Referring to FIGURE 2, the image of the ½ inch diameter blackbody 10a (FIGURE 3) is about 3/16 inch in diameter at the plane of the detector 20 which detector 20 has an aperture 34a 0.0012 inch by 0.0012 inch, thus making the response independent of the size of the blackbody 10a and dependent only on its brightness. With this arrangement regardless of whether the ½ inch diameter blackbody 10a or the 5 inch diameter heated body 10 is used, the radiation signal caused by each depends only on the radiation emitted per unit solid angle and per unit area, per unit time, which radiation emitted is known as the "radiance" and is analogous to visual "brightness."

In order that the output of the detector $20^4$ (FIGURE 4) is independent of the geometry of the apparatus 12 and depends only upon the relative abilities of the blackbody 10a and heated body 10 to emit thermal radiation per unit area, and per unit time, per unit solid angle, the lens $22^4$ is employed with detector $20^4$. Alternatively in FIGURE 5 apertures $34^5$ in plates or baffles $36^5$ achieve a similar result. The use of the lens $22^4$ causes greater thermal radiation to impinge upon the detector 20 than the use of the baffles $36^5$.

During tests of the apparatus 12 (FIGURE 1) the blackbody 10a was positioned at 16 in the housing 17a (FIGURE 3) and its temperature varied in increments of 50° F. At each temperature, the radiation output, as seen by the detector 20 through each of five different optical filters 24 was recorded. These optical filters 24 of the interference type are manufactured by Infrared Industries, Inc. of Waltham, Mass. The designation of one of the filters 24 and a description of its transmission is given below.

Type BP 217–7 centered at 2.17 microns, with a half-width of 0.7 micron (1 micron=10,000 Angstroms).

The detector output of the detector 20 in millivolts, when used with the Type BP 217–7 filter 24, for given temperatures of the blackbody 10a is shown in FIGURE 7.

The blackbody 10a was then removed, and the metal sample 10, mounted on the copper disc 18j (FIGURE 6) was placed in front of the lens 22. The temperature of the sample 10 was raised in increments of 50° F., and the detector output as seen through the Type BP 217-7 filter 24 was recorded. The detector output for blackbody radiation at the same temperature was then obtained from the previously plotted blackbody curve for use in calculating the emittance factors of the samples 10 which are shown in FIGURES 8-11. The emittance factors in FIGURES 8-11 were calculated for example in the case of No. 3 finish black plate at a temperature of 464° F. as follows:

$$\text{Emittance} = \frac{\text{Detector Output for Sample}}{\text{Detector Output for Blackbody}} = \frac{3.7 \text{ mv.}}{16 \text{ mv.}} = 0.231$$

The factors shown in Table I below are averages obtained from the data shown in FIGURES 8-11.

TABLE I.—EMITTANCE FACTORS FOR DETECTOR 20 AT 1.8 TO 2.3 MICRONS

| Type of Sample 10 | Emittance factor | Temperature range, ° F. |
|---|---|---|
| No. 3, 5 and 7 finish black plate | 0.20 | 400-650 |
| No. 7 finish tinplate (melted and unmelted) | 0.10 | 400-445 |
| No. 3 and 5 finish tinplate (melted and unmelted) | 0.15 | 400-445 |
| No. 7 finish aluminum-coated black plate | 0.035 | 400-650 |

The above emittance factors for the various samples 10 can be set on a standard pyrometer with the same spectral response to accurately measure by such pyrometer the operating temperatures of such samples in a production line in a mill or factory.

SUMMARY OF THE ACHIEVEMENTS OF THE OBJECTS OF THE INVENTION

It will be recognized by those skilled in the art that the objects of the present invention have been achieved by providing an improved apparatus which measures the emittance factor of any body routinely, determines the best mean value of the emittance factor for a body in a given temperature range, and determines the variations in emittance for a given process material over a given temperature range, thus defining the errors in measured temperature due to emittance variations, and making it possible to choose a wave length band for measurement to reduce these errors to acceptable limits.

While in accordance with the patent statutes preferred and alternative embodiments of the present invention have been illustrated and described in detail, it is to be particularly understood that the invention is not limited thereto or thereby.

I claim:
1. Apparatus for the selective measurement of the emittance of a heated body at a predetermined temperature, said apparatus having
   (a) a frame having a location adapted to receive said heated body,
   (b) heating means connectable to said heated body to heat said heated body to said predetermined temperature and to maintain said heated body at said predetermined temperature,
   (c) chopping means on said frame adjacent said heated body for converting thermal radiation from said heated body into an alternating radiation signal,
   (d) thermal radiation detection means on said frame at a predetermined distance from said location so that the target area of said heated body fills the field of view of said thermal radiation detection means,
      (1) said thermal radiation detection means being operable to measure the alternating radiation signal from said heated body by converting said alternating radiation signal into an alternating electrical signal,
      (2) said thermal radiation detection means having a reference alternating electrical signal from a blackbody disposed at said location in said apparatus, so that the ratio of the alternating electrical signal from said heated body to the reference alternating electrical signal from said blackbody is the emittance of said heated body at said predetermined temperature,
   (e) housing means disposed about said location and said heating means and provided with a protective atmosphere.
2. Apparatus recited in claim 1 and having filter means on said frame adjacent said thermal radiation detection means for selecting a predetermined wave length band of thermal radiation from said heated body and directed to said thermal radiation detection means.
3. The apparatus recited in claim 2 and having focusing means on said frame adjacent said location for focusing the thermal radiation from said heated body and from said blackbody on said thermal radiation detection means.
4. The apparatus recited in claim 2 and having limiting means on said frame adjacent said thermal radiation detection means for limiting the cross-sectional area of the beam of thermal radiation from said heated body and said blackbody directed to said thermal radiation detection means.
5. The apparatus recited in claim 2 and having storage means disposed on said frame adjacent said thermal radiation detection means for receiving said alternating electrical signals of said heated body and said blackbody from said thermal radiation detection means and indicating the magnitude of said alternating electrical signals of said heated body and said blackbody.
6. The apparatus recited in claim 5 and having preamplifier means on said frame between said storage means and said thermal radiation detection means for amplifying said alternating electrical signals from said heated body and from said blackbody.
7. The apparatus recited in claim 6 and having bandpass filter means on said frame between said storage means and said preamplifier for attenuating electrical noise in said alternating electrical signals of said heated body and said blackbody from said thermal radiation detection means.
8. The apparatus recited in claim 1 and having temperature measuring means connectable to said heated body and then to said blackbody for indicating the temperature of said heated body and said blackbody during the heating thereof.

References Cited
UNITED STATES PATENTS

| | | |
|---|---|---|
| 2,837,917 | 6/1958 | Machler. |
| 2,963,910 | 12/1960 | Astheimer _____ 73—355 |
| 3,069,893 | 12/1962 | Kerstetler. |
| 3,340,722 | 9/1967 | Gabron et al. _____ 73—355 |
| 3,084,253 | 4/1963 | McHenry et al. |
| 3,316,404 | 4/1967 | Cruse. |

OTHER REFERENCES

Barnard, B.: "Determining Emissivity," Inst. & Control Systems, May 1964, pp. 87-89, vol. 37, 5.

RALPH G. NILSON, Primary Examiner

MORTON J. FROME, Assistant Examiner

U.S. Cl. X.R.

73—15, 355

UNITED STATES PATENT OFFICE

CERTIFICATE OF CORRECTION

Patent No. 3,483,378　　　　　　　　　　　　　　December 9, 1969

Thomas P. Murray

It is certified that error appears in the above identified patent and that said Letters Patent are hereby corrected as shown below:

Column 1, line 71, "quantative" should read -- quantitative --. Column 2, line 52, after "length" insert -- range --; line 7 cancel "detection means". Column 3, line 50, "heater or" should read -- heater of --; line 58, "sulfide of" should read -- sulfi or --. Column 6, line 25, after "with" insert -- a --.

Signed and sealed this 10th day of November 1970.

(SEAL)

Attest:

Edward M. Fletcher, Jr.
Attesting Officer

WILLIAM E. SCHUYLER, JR.
Commissioner of Patents